Aug. 30, 1955 — E. W. LARSON ET AL — 2,716,442
FLAT-SPRING BASE ASSEMBLY AND CLIP
Filed Feb. 16, 1953
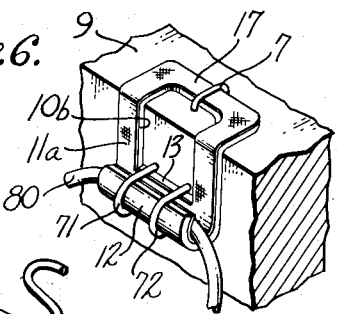
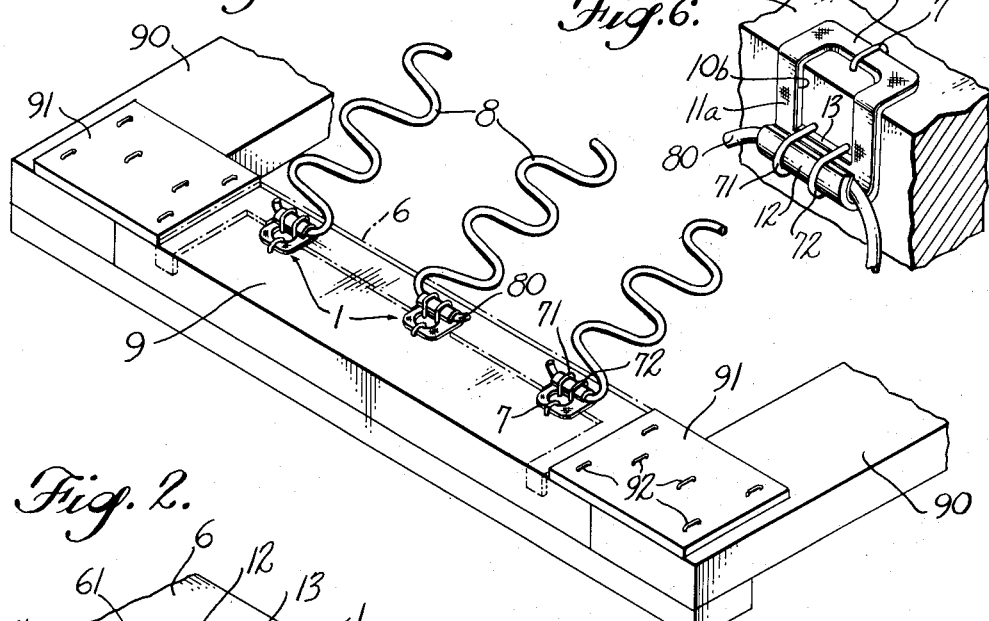
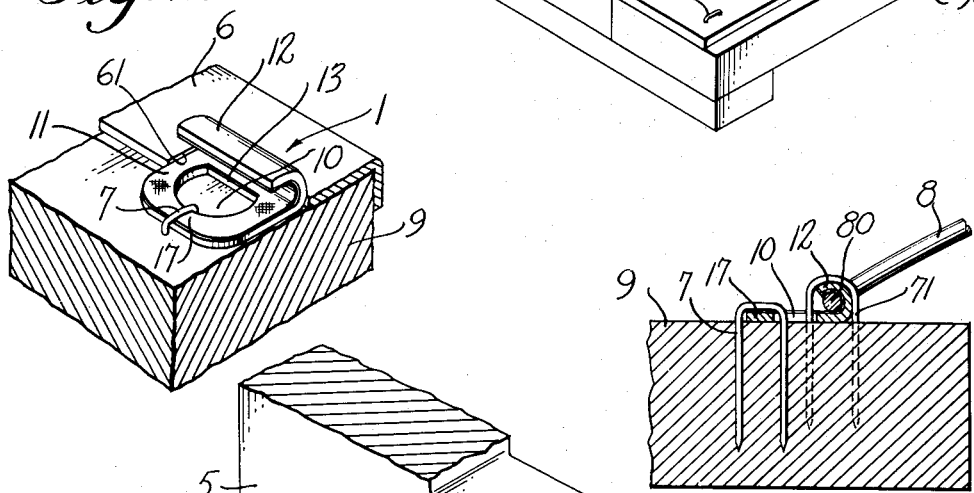
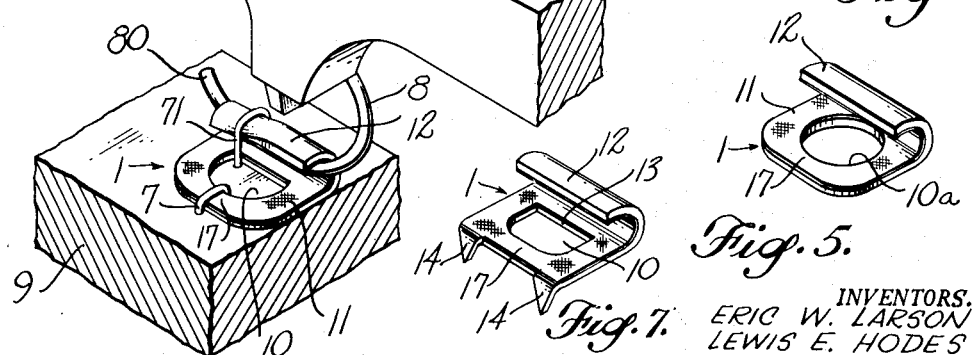
INVENTORS.
ERIC W. LARSON
LEWIS E. HODES
WILLIAM J. MOORE
BY Reynolds, Beach & Christensen
ATTORNEYS

United States Patent Office 2,716,442
Patented Aug. 30, 1955

2,716,442

FLAT-SPRING BASE ASSEMBLY AND CLIP

Eric W. Larson, Lewis E. Hodes and William J. Moore, Seattle, Wash., assignors to L H M Company, Seattle, Wash.

Application February 16, 1953, Serial No. 337,076

9 Claims. (Cl. 155—179)

This invention relates to upholstering, and more particularly to the anchoring of the ends of flat springs in a spring base assembly to the wooden marginal members of the frame.

It has been the custom heretofore to employ a hooked clip to receive the terminals of such flat springs, and to attach the clips to the wooden frame by means of upholsterer's nails, formed with small heads. One such nail is used first, being passed through a hole in the clip and driven into the wooden frame, to secure the base of the clip preliminarily in correct location, and to enable engagement of the spring ends with the clip's hook, and thereafter one or two additional nails are employed to bend down the edge of the hook which forms part of the clip, to anchor the spring end engaged behind that hook in correct relationship to the hook, and to further secure the clip to the frame. Because the head of the nail is small, and because each nail's shank should fit closely within its hole in the clip, to eliminate shifting of the clip when once secured, the clip's holes are each only large enough to receive the nail, and the nail must be inserted accurately, carefully, and hence rather slowly, by hand, through this small hole, or where the nail engages also the hook as well as the clip's base, then through two aligned holes, individually provided for that particular nail, and the nail must then be driven home with a hammer held in the other hand. In other words, it was a meticulously performed and time-consuming procedure, involving several distinct hand operations. Contrasted with this, the wooden pieces which constitute the supporting frame are customarily held together by double-pointed staples driven through plywood gusset plates at the joints by a hand-positioned but air-opertaed stapling machine. This is feasible because there are no precise locations or holes through which the securing elements must pass, and so the job can be done easily and quickly, and quite satisfactorily. The speed with which the frame-forming operation can be performed, and its low cost, are in marked contrast to the slowness and expensiveness of the hand work by which the clips are located and the spring ends are anchored in place. Since, then, the stapling machine is available and is in use in such factories, and achieves such advantages, it is a primary object of the present invention to provide a clip, an assembly, and a method whereby such stapling machines may be employed for locating the clip and anchoring the spring end, with structural results at least equal to those attendant upon the hand operations, to the ultimate end that this last hand operation can be eliminated and the entire job of assembling such a spring base assembly can be accomplished easily, quickly, and cheaply by the use of the semi-automatic stapling machine.

The objects just expressed are accomplished in large measure by the employment of a clip of special form and shape, resembling the clips previously used except in that it is formed with relatively narrow margins in its base portion, capable of being spanned, without the need of great accuracy, by a double-pointed staple, which narrow margins may be formed by stamping out a single large aperture in its base portion, so that only a narrow marginal portion is left surrounding the aperture. Through this aperture and into the wooden frame member beneath it, according to the preferred procedure, may be driven one point or leg of a double-pointed locating staple, the other leg whereof enters the wooden frame outside the narrow margin, and so each such staple spans a portion of the clip, and this one staple will locate the clip accurately in place. According to slightly different procedure the clip is located by claw tips which are formed integrally with the clip, and no locating staple is required. In either event another staple, or preferably two others, will subsequently span the hook and the spring end which has been engaged therewithin, and an underlying narrow marginal portion of the base, to secure this spring end and the hook, and the clip as a whole, firmly to the marginal board of the supporting frame beneath, and to anchor the spring end within its hook. The clip will preferably depart from prior clips in a further respect, in that its hook must be of shallow enough depth to enable a two-pointed staple to span it readily, and since normal staples have a relatively narrow span, the hook should be correspondingly shallow.

In the accompanying drawings the invention is shown embodied in several forms of clip, including one which is preferred for normal use, another of which is for a special purpose, and a third which is modified to enable omission of the locating staple.

Figure 1 is an isometric view of one edge of a flat-spring base assembly with the anchoring of the clips and spring ends completed in accordance with this invention, according to the preferred procedure.

Figure 2 is an isometric view, to an enlarged scale, showing the first step of fixing a clip of the preferred form in correct location.

Figure 3 is a similar isometric view showing a following step of anchoring the spring end within the hook of the clip, and further securing the clip to the frame board, and showing a stapling machine nearly in position to accomplish the final step in the assembly.

Figure 4 is a sectional view lengthwise of such a clip and transversely of the marginal frame board to which it is anchored, showing the manner in which the clip and the spring terminal are anchored by the staples.

Figure 5 is an isometric view of a slightly modified form of the clip, and Figure 6 is an isometric view of a further modified form, employed for a special purpose or at least at a special location.

Figure 7 is an isometric view of a further modified form of the clip.

In such flat-spring base assemblies two marginal boards of wood, of which a single board is shown at 9, are held spaced apart in generally parallel relationship by spacer boards 90. It is customary to join the boards 9 and 90, at least in part, by a wooden gusset plate 91, held by staples 92 to the respective frame boards 9 and 90. It will be understood that the illustration of frame details is intended merely as typical, and not as ruling out other means of forming or joining the members of such a frame.

Flat springs 8 of the conventional form are stretched between the opposite frame members 9. Each is formed of a spring wire bent in sinuous form and inherently stressed to define, when its ends are left free, substantially a circle, but when its ends are stretched out it defines a bow which in use is upwardly convex, or if the frame is the base of a back cushion the springs bow forwardly. It is necessary to provide means to anchor the spring ends to the frame boards 9 in this stressed disposition, and to do so by means which will remain secure throughout the life of the base assembly, notwithstanding the repeated flexing to which the springs 8 will be subjected.

Each spring terminates at each of its opposite ends in a straight bar 80, which extends transversely to the general length of the spring. Clips which are formed with hooks and which are secured to the frame with their hooks facing outwardly from the center of the frame, are provided for engagement with these terminals 80. According to the present invention such a clip, generally designated by the numeral 1, is formed of a short strip of sheet metal or the like (it is intended to include a plastic material, for example, should such be found suitable, or should one be developed that will have adequate strength) and this strip of sheet metal is shaped or bent to define a base portion 11 and a retainer portion 12. The retainer portion is formed or bent upwardly from the general plane of the base portion 11, and then reversely back over the base portion to constitute a hook. It will be referred to hereinafter as the hook 12. As has already been indicated, this hook is preferably of a shallow depth, corresponding to the span of a double-pointed staple, that is to say, of a depth no greater, in the usual case, than approximately the thickness of the terminal portion 80 of the spring end which is to be anchored within this hook 12. The hook's transversely directed edge is spaced above the base portion 11 of the clip by about the same distance, that is to say, just sufficiently to receive readily the thickness of the spring terminal 80.

There is formed in the base portion 11 of the clip a single aperture, designated by the numeral 10. That aperture may vary considerably in its shape or outline, but preferably it is in any form large enough to occupy the greater part of the area of the base portion 11, and to leave a surrounding margin which in at least its portion 17 is narrow enough to be spanned readily by the usual double-pointed staple 7, except perhaps in the form of clip shown in Figure 7. So narrow a neck is not essential in the form of Figure 7, but is not objectionable and may be preferable even in that form. In all forms wherein there is such a narrow neck, the interior margins of the aperture 10 converge towards this point of nearest approach to the end of the clip, and conversely diverge thence to a transverse line of greatest width which lies immediately beneath the transverse end or edge of the hook 12. By such convergence a staple that spans the neck 17, as later described, tends to prevent lateral displacement of the clip, as well as longitudinal displacement.

These purposes are most conveniently accomplished by making the aperture of circular or part-circular shape, and preferably it is substantially semicircular in shape, as is best seen in Figures 2 and 3. When it is semicircular the line 13, which is a diametral or near-diametral line, extends transversely of the clip and substantially immediately beneath and parallel to the end margin of the hook 12. Since the hook 12 is shallow, so, too, that part of the base portion which lies beneath the hook and beyond the straight line 13 is likewise shallow, and each of these, the hook and the underlying part of the base portion, can be spanned easily by a normal staple such as the staple 71, which is identical with and may come from the same stapler as the staple 7. In a modified form, shown in Figure 5, the aperture 10a is completely circular, and some may consider this to be the more convenient form to manufacture or to use, although presently the form shown in Figures 2 and 3, with the straight line 13 interrupting the circular form of the aperture 10, is preferred. When the circular aperture 10a is used, it is still so located relative to the hook's end margin that a diametral or near-diametral line lies immediately beneath the hook's end margin, and part of the circle's margin lies beneath the hook.

The form of clip illustrated in Figure 7 differs from the form of Figures 2 or 5 in that down-turned claw tips 14 are provided at the end of the base which is distant from the hook 12. Their function is to locate the clip temporarily upon the frame bar 9, by pressing or tapping the base downwardly until these tips penetrate the board, thus eliminating the need for the locating staple 7. There is no great need for a narrow neck 17, but there is no reason why it should not be provided, and on occasion the use of a locating staple 7 may be desirable in addition to the tips 14, and to resist disengagement of the latter.

When a spring base assembly is to be assembled according to the usual procedure, each of several clips is laid upon the marginal board 9, located in proper position to receive and engage subsequently the terminal 80 of its spring. These clips could be thus located by index marks upon the board 9, but preferably are located by means of a jig 6 applied to the board 9 and having notches 61 in position to receive and properly locate each such clip. The jig is of such form that the narrow neck 17 of the base portion is in the clear, and with the clip thus located a stapling machine, represented conventionally at 5, is employed to drive a locating staple 7 into the board 9 in such manner that one point of the staple passes through the aperture 10 into the board, and the other point of the staple lies outside the end of the clip. The staple as a whole spans the neck 17. This result is shown in Figure 2. The jig 6 may be removed when all the clips have been thus located and fixed in proper position, or if the jig is properly relieved for the driving of further staples about to be described, it may be left in place. In any event, the next step is to stretch the springs 8 nearly flat and to engage their terminals 80 with the proper clips, hooking the terminals 80 beneath the hooks 12. Now with all the springs engaged, the stapler 5 is again brought into operation, and first a staple 71 is driven into the board 9, one leg passing through the aperture 10 near one end of the straight line 13, with this staple 71 spanning the hook 12 and the spring terminal 80 engaged therewithin, so that the opposite point of the staple 71 is driven into the board 9 outwardly beyond the hook 12. The stapler, being preferably power driven, strikes a reasonably sharp blow, sharp enough to bend the transverse bar of the staple about the hook and about the spring terminal 80, and also to bend the edge of the hook somewhat about the spring terminal 80, in the manner shown in Figure 3. One such staple 71 in addition to the staple 7 might prove sufficient in some cases to accomplish the anchoring of the springs, but preferably two such staples are used, the staple 72 being driven home in the same manner as the staple 71, but at the opposite end of the diametral line 13 of the aperture. Its effect is similar to that already described, and the final result provides three points of secure engagement between the clip and the frame board 9, and two spaced points of secure engagement between the clip, the spring terminal, and the frame board 9. In addition the hook 12 is bent around the spring terminal 80 which is received therewithin.

It will be observed that the employment of the stapler 5 is permitted, and time for completing the operation is greatly reduced, primarily because of the large size and disposition of the aperture 10 or 10a and its general shape and relationship to the other parts of the clip, and secondarily by the shallowness of the hook 12, whereby a staple may span it readily. Thus staples could of course be driven by hand, or by a manual stapling machine, but since the primary object of the present invention is to eliminate hand operations at this point, and to enable all such operations to be performed quickly and easily by semi-automatic power-driven stapling machines, it is evident that the clip must be so formed that the staples may readily be engaged with or span the appropriate portions of the clip, and so be driven into the board beneath, without the necessity of careful positioning, or the possibility of inadvertently attempting to drive the staple into any part of the metallic clip. These ends are admirably promoted by the size, shape and arrangement of the apertures 10 and 10a with relation to the shallowness of the hook 12, the narrowness of the neck 17, and like constructional features of the clip itself.

As has been explained, the form of clip shown in Figure 7 makes possible the location of the clips upon the board by the penetration of the tips 14. This will not ordinarily prevent the tips from pulling out under the pull of the flat springs 8, hence if this form of clip is used, without a locating staple 7, the clips will have to be held in place by hand during and until completion of the anchoring operation by the staples 71, 72. Thereafter these two staples may constitute an adequate anchorage for the clip and spring end. Alternatively, the tips 14 may serve as temporary locating means, perhaps in lieu of the jig 6, until a locating staple 7 can be driven home spanning the neck 17.

At times it is desired to engage such a clip close to the corner or edge of a frame bar 9, rather than upon the flat face thereof. The clip in the modified form of Figure 6 is intended for that purpose. Its base portion 11a is slightly elongated and its aperture 10b is correspondingly elongated, so that the staple 7, by which the clip is located and fixed in position preliminarily, will not come too close to the surface of the board into the edge of which it is driven, and so that the staples 71 and 72 will likewise not come too close to the corner or edge of the board. In all other respects the clip of this form is or may be of the same shape as the clip in any of the forms previously described.

Ordinarily such clips are lined, as with a fabric material or a thin sheet of some suitable material, for the purpose of eliminating metal-to-metal friction and the noise or squeaking such as might result therefrom. The clips of the present invention are illustrated as thus lined.

We claim as our invention:

1. A spring-end anchor clip for anchoring the end of an upholsterer's flat spring to a wooden supporting frame, comprising an elongated strip of sheet metal or the like, one end whereof is bent upwardly from and then reversely back over the remainder of the strip, to define a shallow hook of a depth approximating the thickness of the spring end, and of a width substantially equalling the length of the spring end, the remainder of the strip being substantially flat and formed with an aperture which extends close enough to the end opposite the hook to leave there a narrow margin, and which extends close enough to the hook, and is of such shape, as to leave a clear, open space close to and beneath each transverse end of the hook, each such transverse end of the hook and the narrow margin being of a transverse extent to be spanned readily by an upholsterer's double-pointed staple driven into the supporting frame with one point, in each staple, entering through the aperture and its other point outside the clip, at locations at the opposite sides of the hook and at the narrow margin, respectively.

2. A clip as and for the purpose expressed in claim 1, wherein the base's aperture is of a width, along a line directly beneath the edge of the hook, approaching the full width of the hook.

3. A clip as defined in claim 2, wherein the opposite side edges of the aperture distance from the hook, and the corresponding side edges of the base, trend towards one another at a point centralized between the ends of and most distant from the hook.

4. A clip as defined in claim 2, wherein the aperture is substantially circular, and is so located that the hook's transverse edge overlies a chord approximating a transverse diameter of the aperture.

5. A clip as defined in claim 1, wherein the aperture is approximately semi-circular, with its diametral edge parallel to and underlying the hook's transverse edge.

6. A clip as in claim 1, wherein the base portion is bent along a transverse line intermediate the hook's edge and the distant end of the base portion, to fit over an edge of the supporting frame.

7. The combination of a wooden supporting frame for furniture including two spaced-apart marginal boards, and a plurality of flat springs stretched from one such marginal board to the other, and having a transversely directed end portion at each end, anchor clips each comprising a strip of sheet metal or the like including a base portion and bent upwardly and then back over its base portion at one end to define a shallow transverse hook of a width corresponding to the length of the spring's end portion and of a depth approximating the thickness of such end portion, the base portion of each clip having an aperture and such aperture being of maximum width in the vicinity of the ends of the hooks, there being a plurality of such clips secured to the marginal boards of the frame at locations corresponding to, and having their hooks engaged with, the respective springs' end portions, and two upholsterer's double-pointed staples each spanning one of the opposite ends of each hook and driven into the marginal boards, with one point of each entering the aperture.

8. The combination of claim 7, including a third double-pointed staple spanning the base portion of each clip, distant from the hook thereof, and driven into the marginal board with one point thereof entering the aperture and its other point outside the margin of the base portion, said third staple constituting the means to secure the clip to the frame.

9. The combination of claim 7, wherein the hooks' ends are bent downwardly towards the underlying base portion, beneath the driven staples that span them, to retain the spring end received therein.

References Cited in the file of this patent

UNITED STATES PATENTS

| | | |
|---|---|---|
| 682,847 | Forsyth | Sept. 17, 1901 |
| 860,261 | Sorey | July 16, 1907 |
| 1,024,744 | Peterson | Apr. 30, 1912 |
| 2,166,989 | Gleason | July 25, 1939 |
| 2,257,633 | Bank | Sept. 30, 1941 |

FOREIGN PATENTS

| | | |
|---|---|---|
| 27,637 | Norway | July 26, 1920 |
| 324,737 | Great Britain | Feb. 6, 1930 |